United States Patent
Chang et al.

(10) Patent No.: US 8,660,261 B2
(45) Date of Patent: Feb. 25, 2014

(54) SYSTEM AND APPARATUS FOR INTEGRATED VIDEO/IMAGE ENCODING/DECODING AND ENCRYPTION/DECRYPTION

(75) Inventors: Yu-Lin Chang, Hsin-Chu (TW); Wensheng Zhou, Los Angeles, CA (US)

(73) Assignee: Mediatek Singapore Pte. Ltd., Singapore (SG)

( * ) Notice: Subject to any disclaimer, the term of this patent is extended or adjusted under 35 U.S.C. 154(b) by 1038 days.

(21) Appl. No.: 12/478,182

(22) Filed: Jun. 4, 2009

(65) Prior Publication Data
US 2010/0310065 A1    Dec. 9, 2010

(51) Int. Cl.
*H04L 9/00* (2006.01)
(52) U.S. Cl.
USPC .......... 380/28; 380/29; 380/30; 380/43; 380/217; 371/67
(58) Field of Classification Search
USPC .............. 380/28, 43, 181, 217; 341/67
See application file for complete search history.

(56) References Cited

U.S. PATENT DOCUMENTS

| | | | | |
|---|---|---|---|---|
| 5,285,497 | A * | 2/1994 | Thatcher, Jr. | 380/217 |
| 6,879,268 | B2 * | 4/2005 | Karczewicz | 341/67 |
| 6,980,138 | B2 * | 12/2005 | Vassiliadis et al. | 341/67 |
| 2004/0021592 | A1 * | 2/2004 | Karczewicz | 341/67 |
| 2004/0070525 | A1 * | 4/2004 | Vassiliadis et al. | 341/67 |
| 2008/0002882 | A1 * | 1/2008 | Voloshynovskyy et al. | 382/181 |
| 2008/0273693 | A1 * | 11/2008 | Au et al. | 380/28 |
| 2009/0041236 | A1 * | 2/2009 | Gligoroski et al. | 380/43 |
| 2010/0067688 | A1 * | 3/2010 | Au et al. | 380/43 |
| 2010/0138668 | A1 * | 6/2010 | Tsuria et al. | 713/186 |
| 2010/0183148 | A1 * | 7/2010 | Bellwood et al. | 380/44 |
| 2012/0163583 | A1 * | 6/2012 | Nakagata et al. | 380/28 |
| 2013/0094649 | A1 * | 4/2013 | Tomlinson et al. | 380/30 |

OTHER PUBLICATIONS

Wu et al., "Design of Integrated Multimedia Compression and Encryption Systems", IEEE Transactions on Multimedia, vol. 7, No. 5, Oct. 2005, pp. 828-839.
Xie et al., "Multimedia Encryption with Joint Randomized Entropy Coding and Rotation in Partitioned Bitstream", EURASIP Journal on Information Security, vol. 2007, Article ID 35262, pp. 1-18, Hindawi Publishing Corporation.

* cited by examiner

*Primary Examiner* — Thu Ha Nguyen
(74) *Attorney, Agent, or Firm* — Chen Yoshimura LLP (57) ABSTRACT

An encryption-enabled entropy coder for a multimedia codec is disclosed. The entropy coder implements a randomized Huffman coding scheme without storing multiple sets of Huffman tables in a ROM. The entropy coder includes a ROM storing a single set of code tables, a table lookup section coupled to the ROM which converts symbols to original codewords and vice versa by performing table lookup, and a table randomizer section for converting original Huffman codewords to randomized Huffman codewords and vice versa using an isomorphic code generator algorithm. The table randomizer section performs the conversion based on a key hopping sequence generated by a pseudorandom bit generator using an encryption/decryption key.

18 Claims, 10 Drawing Sheets

SYSTEM AND APPARATUS FOR INTEGRATED VIDEO/IMAGE ENCODING/DECODING AND ENCRYPTION/DECRYPTION

BACKGROUND OF THE INVENTION

1. Field of the Invention

This invention relates to image and video processing, and in particular, it relates to a device and method for entropy encoding/decoding with encryption/decryption.

2. Description of the Related Art

Conventional entropy coding methods and hardware for image and video compression use pre-defined tables to map symbol to codewords. Integrated multimedia compression and encryption systems using modified entropy coders with multiple statistical models have been proposed.

One reference, "Design of Integrated Multimedia Compression and Encryption Systems", Chung-Ping Wu and C.-C. Jay Kuo, IEEE TRANSACTIONS ON MULTIMEDIA, Vol. 7, No. 5, October 2005 (the "Wu and Kuo article"), describes two encryption schemes which apply a multiple statistical models approach to a Huffman coder and a QM coder (QM is a simplified case of an adaptive arithmetic coder) in encoding audio/video/image data such as MPEG audio, MPEG video, and JPEG/JPEG2000 images. In this article, the modified Huffman coding scheme is referred to as a multiple Huffman table (MHT) coding scheme and the modified QM coding scheme is referred to as the multiple state indices (MSI) coding scheme.

Another reference, "Multimedia Encryption with Joint Randomized Entropy Coding and Rotation in Partitioned Bitstream", Dahua Xie and C.-C. Jay Kuo, Hindawi Publishing Corporation, EURASIP Journal on Information Security, Volume 2007 (the "Xie and Kuo article"), describes an encryption approach that consists of two cascaded modules, the first being randomized entropy coding (REC) which uses multiple entropy coding parameters/settings according to a random sequence inside the entropy coder, the second being rotation in partitioned bitstream (RPB) which further performs a random rotation to the output of the REC stage to yield the final bitstream. Two REC schemes were described; one is referred to as randomized Huffman table (RHT) scheme for Huffman coding, the other one is referred to as randomized arithmetic coding convention interleaving (RACCI) scheme for arithmetic coding.

The RHT is an expansion of the MHT approach previously described by Wu and Kuo. In the RHT encryption scheme, a number of different Huffman codes that correspond to the same Huffman tree are constructed and published. The different Huffman codes can be constructed using a technique called the Huffman tree mutation process. Then, a particular Huffman code is chosen to encode each input symbol according to a key hopping sequence (KHS). The KHS is a sequence of numbers generated from a secret seed (key) s by a pseudorandom bit generator (PRBG). To decode the encoded bitstream, the key (random seeds) must be known in order to reproduce the KHS using the PRBG and in turn correctly decode the Huffman codewords in the bitstream.

Figure 1A:
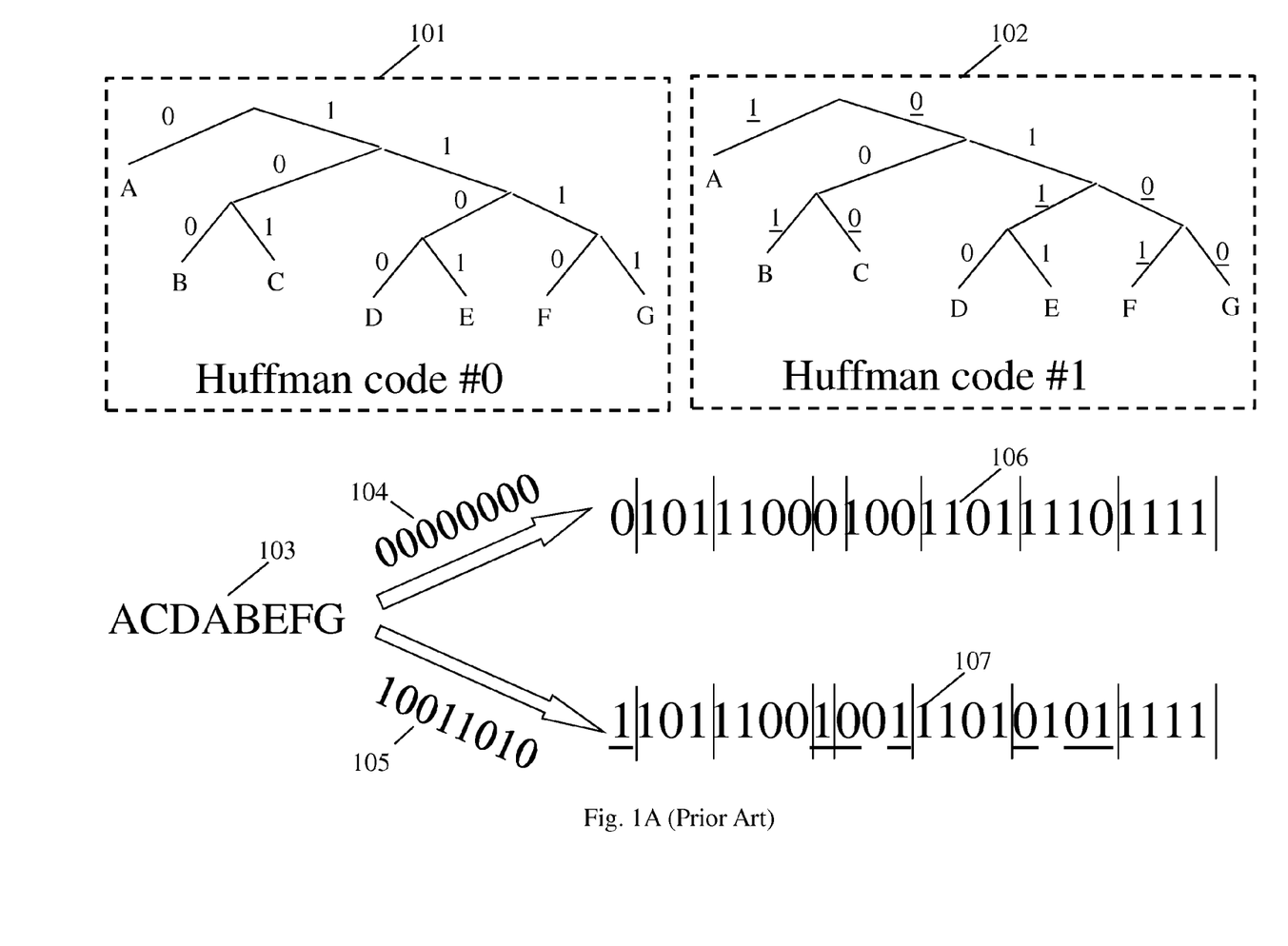
FIG. 1A schematically illustrates the principle of a prior art RHT coding scheme.

The RHT algorithm is illustrated by an example shown in FIG. 1A, which is adapted from the Xie and Kuo article. The source input is composed of seven symbols, denoted A through G. Two different Huffman codes (Huffman trees), code #0 101 and code #1 102, are constructed to encode these seven symbols. The topologies of these two Huffman trees are the same (i.e. the two Huffman codes are isomorphic codes of each other) so the codeword length for each symbol is identical, although the codeword values are different. In this example, the 0 and 1 pairs are swapped at four places as indicated by underlines in code #1 in FIG. 1A. A sample input plaintext 103 "ACDABEFG" is encoded using a KHS 105 "10011010". A "0" in the KHS indicates that Huffman code #0 is used to encode the corresponding plaintext symbol while "1" indicates the use of Huffman code #1. The resulting ciphertext (encoded bitstream) 107 is "11011100100110101011111" (here, the short vertical lines denote the boundaries of Huffman codewords). As a comparison, FIG. 1A also shows another KHS 104 "00000000", with a resulting ciphertext 106 "01011100010011011111101111" (the short vertical lines again denote the boundaries of Huffman codewords). The all-zero KHS 104 is equivalent to the conventional Huffman coding scheme using only one Huffman code (code #0). The bits indicated by underlines in the ciphertext 107 show where the ciphertext 107 differs from the ciphertext 106.

If the ciphertext 107 (encoded using the KHS 105) is decoded using an incorrect KHS, the resulting decoded plaintext will not be the same as the input plaintext 103. For example, if a KHS "00000000" is used to decode it, the resulting plaintext would be "EDBFCAG"; if a KHS "10111010" is used, the resulting plaintext would be "ACAABAEA". As noted in the Xie and Kuo article, since Huffman code is a uniquely decodable code, decoding can always continue with any KHS; this decoding error will not be detected until the wrong results are further converted to raw multimedia content and found meaningless.

In the RHT algorithm described in the Xie and Kuo article, more generally, $M=2^m$ Huffman tables are generated and numbered from 0 to M−1. The KHS is broken into m-bit blocks, each value ti of a m-bit block represents a number from 0 to M−1, and the Huffman table ti is used to encode the i-th symbol.

Figure 1B:
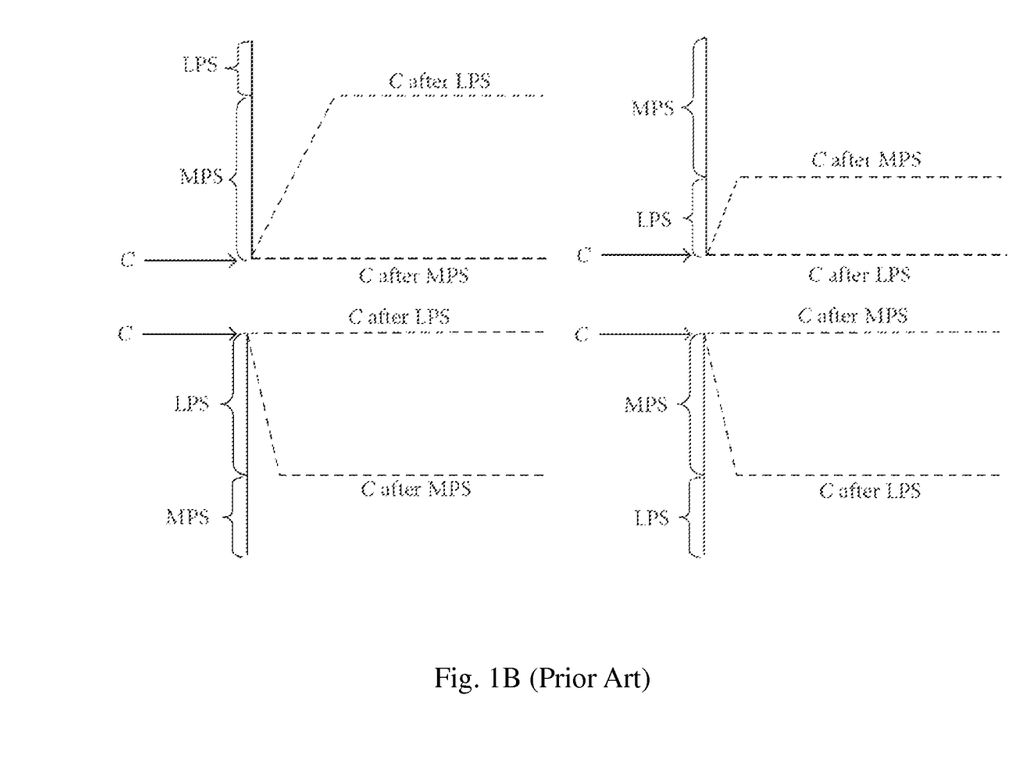
FIG. 1B schematically illustrates the principle of a prior art RACCI coding scheme.

The RACCI scheme descried in the Xie and Kuo article similarly use a randomization technique in the coding. Simply stated, arithmetic coding involves recursive interval subdivision, i.e. a process of repeatedly dividing a probability interval, and a bitstream representing the current intervals at the points of the division is generated. In binary arithmetic coding, there are two possible symbol orderings, i.e., the LPS (less probable symbol) subinterval above the MPS (more probable symbol) subinterval, or the MPS subinterval above the LPS subinterval; there are also two possible code stream conventions, i.e., points to the bottom or the top of an interval. These lead to a total of four possible coding conventions, which are indicated by an arithmetic indicator. The four coding conventions are illustrated in FIG. 1B, which is adopted from FIG. 3 of the Xie and Kuo article. Under the RACCI scheme, the coding conventions used to code each input is selected based on a KHS. Again, the KHS is generated from a secrete seed (key) s by a PRBG.

The MHT described in the Wu and Kuo article and the RHT scheme described in the Xie and Kuo article share a basic theme of employing multiple Huffman tables for coding a plaintext. For convenience, this disclosure uses the term "randomized Huffman coding" to refer to both MHT and RHT. Similarly, this disclosure uses the term "randomized arithmetic coding" to refer to both the MSI scheme described in the Wu and Kuo article and the RACCI scheme described in the Xie and Kuo article.

SUMMARY OF THE INVENTION

The present invention is directed to a hardware architecture for implementing a randomized Huffman coding scheme.

An object of the present invention is to provide a multimedia codec having a cryptography-enabled entropy coder that does not decrease throughput and does not significantly increase the gate count and area of the codec chip.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an encryption-enabled entropy coder for a multimedia codec, which includes: a read-only memory (ROM) storing a single set of code tables, each code table being a code which maps a plurality of symbols to a plurality of codewords; a table lookup section coupled to the ROM, the table lookup section receiving an input bitstream containing a plurality of symbols, the table lookup section performing table lookup using the code tables stored in the ROM to convert the symbols to original codewords, the table lookup section further generating a codeword complete signal to indicate boundaries of the original codewords; and a table randomizer section coupled to the table lookup section for receiving the original codewords, the table randomizer section receiving an encryption/decryption key and the codeword complete signal, the table randomizer section converting the original codewords to randomized codewords based on the encryption/decryption key and the codeword complete signal using an isomorphic code generator algorithm, wherein each randomized codeword is an isomorphic codeword of the corresponding original codeword.

The table randomizer includes: a data buffer receiving and buffering the original codewords; a pseudorandom bit generator (PRBG) receiving the encryption/decryption key and generating a key hopping sequence (KHS) comprising a sequence of numbers, each number in the KHS indicating either the code stored in the ROM or one of a plurality of codes that are isomorphic to the code stored in the ROM; a randomization controller receiving the KHS, the codeword complete signal, and the original codewords, the randomization controller generating a randomization control signal using the isomorphic code generator algorithm based on the KHS, the codeword complete signal, and the original codewords, the randomization control signal being a bitstream; and a switch controlled by the randomization control signal for selectively outputting a next data bit from the data buffer either directly or after being inverted.

In another aspect, the present invention provides an encryption-enabled entropy coder for a multimedia codec, which includes: a read-only memory (ROM) storing a single set of code tables, each code table being a code which maps a plurality of symbols to a plurality of codewords; a table lookup section coupled to the ROM, the table lookup performing table lookup using the code tables stored in the ROM to convert original codewords to symbols, the table lookup section further generating a codeword complete signal to indicate boundaries of the original codewords; and a table randomizer section coupled to the table lookup section, the table randomizer section receiving an encryption/decryption key and the codeword complete signal, the table randomizer section converting input randomized codewords to the original codewords based on the encryption/decryption key and the codeword complete signal using an isomorphic code generator algorithm, wherein each randomized codeword is an isomorphic codeword of the corresponding original codeword, wherein the original codeword are inputted to the table lookup section.

In another aspect, the present invention provides a method implemented in an encryption-enabled entropy codec, including, for entropy encoding: storing a single set of code tables in a read-only memory (ROM), each code table being a code which maps a plurality of symbols to a plurality of codewords; performing table lookup using the code tables stored in the ROM to convert a plurality of symbols to original codewords; and converting the original codewords to randomized codewords based on an encryption/decryption key using an isomorphic code generator algorithm, wherein each randomized codeword is an isomorphic codeword of the corresponding original codeword.

The method further includes, for entropy decoding: converting a plurality of randomized codewords to original codewords based on the encryption/decryption key using an isomorphic code generator algorithm, wherein each randomized codeword is an isomorphic codeword of the corresponding original codeword; and performing table lookup using the code tables stored in the ROM to convert the original codewords to symbols.

It is to be understood that both the foregoing general description and the following detailed description are exemplary and explanatory and are intended to provide further explanation of the invention as claimed.

DETAILED DESCRIPTION OF THE PREFERRED EMBODIMENTS

In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
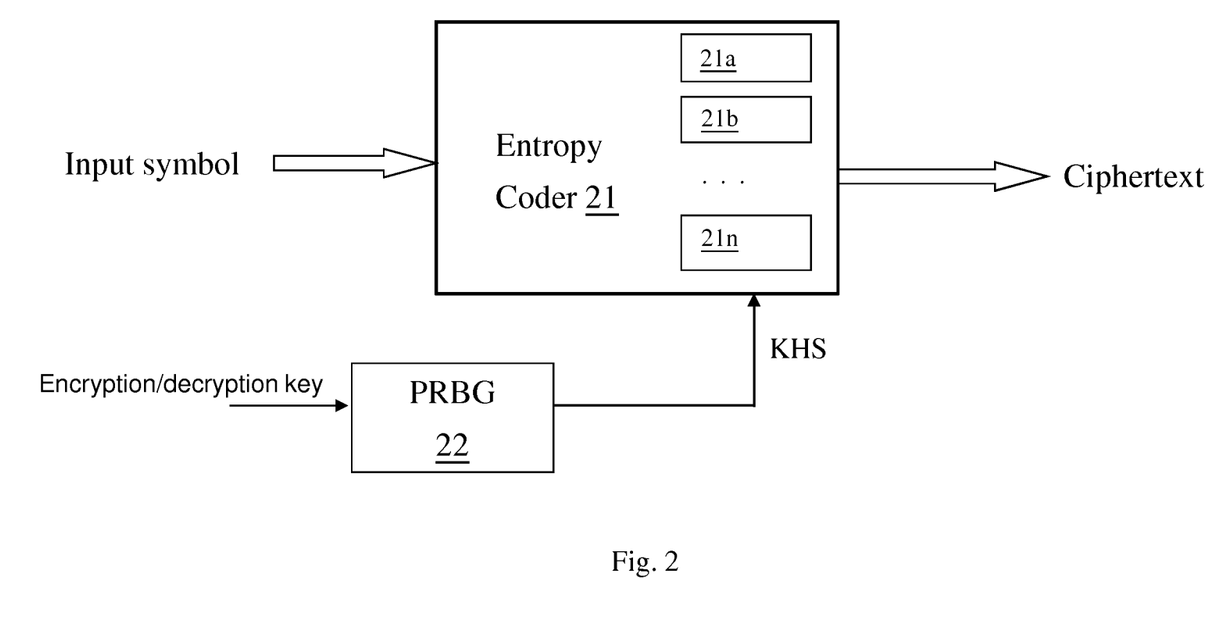
FIG. 2 illustrates a hardware implementation of randomized Huffman coding scheme using multiple stored Huffman tables.

One way to implement a randomized Huffman coding scheme in a hardware (logic circuit) structure, illustrated in FIG. 2, is to store multiple Huffman code tables $21a$, $21b$, . . . $21n$ in a ROM, where the entropy coder 21 selects a Huffman table to use for coding each symbol based on the key hopping sequence (KHS) generated by the pseudorandom bit generator (PRBG) 22. One disadvantage of this approach is that it requires storing a large number of tables. Another way to implement a randomized Huffman coding scheme is to employ a general-purpose processor executing firmware to dynamically generate the table data.

Embodiments of the present invention provides a hardware (logic circuit) architecture for implementing randomized Huffman coding and randomized arithmetic coding that does not require storing multiple Huffman tables (for RHT) or multiple arithmetic indicators (for RACCI). The hardware architecture uses a hybrid table loader module to generate dynamic Huffman tables (for RHT) and dynamic arithmetic indicators (for RACCI). The detailed descriptions below uses randomized Huffman coding as an example; randomized arithmetic coding can be similarly implemented and will be discussed only briefly.

Figure 3:
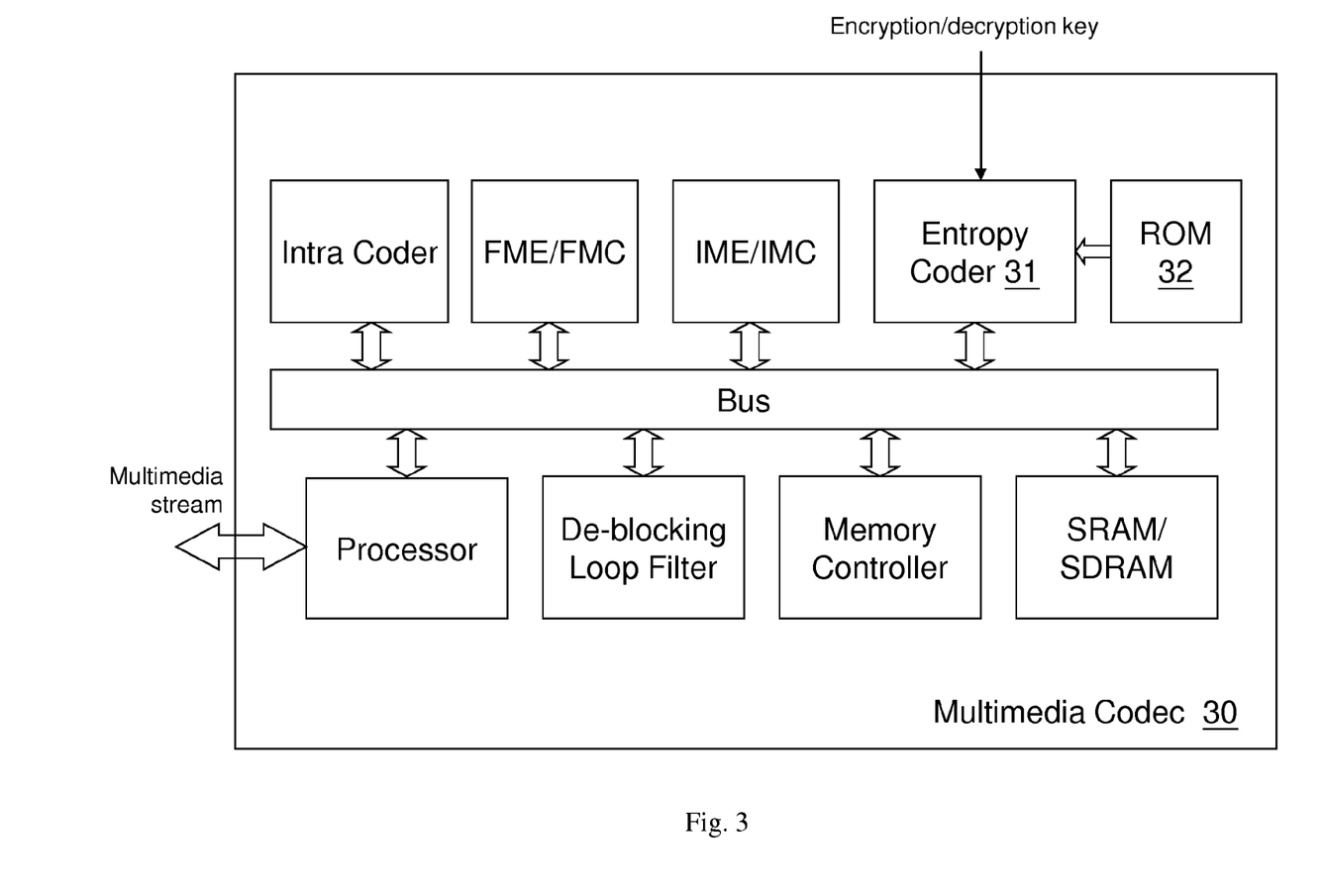
FIG. 3 illustrates the overall structure of a multimedia codec architecture according to an embodiment of the present invention.

The overall architecture of a multimedia codec 30 according to an embodiment of the present invention is shown in FIG. 3. The multimedia codec 30 includes various components found in conventional multimedia codec (i.e. a multimedia codec which implements conventional Huffman coding without encryption), such as an intra coder, a FME (Fractional pixel Motion Estimation) core, an IME (Integer pixel Motion Estimation) core, a processor, a de-blocking core, a memory controller, an SRAM or SDRAM, etc., connected to each other via a local bus. The functions performed by these components are well known to those skilled in the relevant art and they are not described in detail here. The reader is presumed to be familiar with the generally structure of conventional multimedia codecs. Some of these components may be optional, and other conventional components now shown in FIG. 3 may be present.

The ROM 32 of the multimedia codec 30 stores a set of Huffman tables, which may be the same as the set of Huffman tables stored in a conventional multimedia codec. Thus, the table size for the multimedia codec 30 is substantially the same as the table size in a conventional codec. The cryptography-enabled entropy coder 31 of the multimedia codec 30 is a key component which implements embodiments of the present invention, and will be described in more detail below with reference to FIGS. 4-9. As seen in FIG. 3, the entropy coder 31 receives an encryption/decryption key, which is inputted independently of the multimedia stream and not through the local bus. The encryption/decryption key acts as an encryption key in the encryption process and a decryption key in the decryption process. The multimedia stream shown in FIG. 3 is the input and output multimedia data such as image, video, audio, etc.

It is noted that a conventional Huffman coder for image and video data typically uses a set of Huffman tables. For example, an MPEG coder typically uses a DCT coefficient table zero, a DCT coefficient table one, and a number of other VLC tables for encoding parameters such as macroblock types, coded block pattern, motion code, etc. (Huffman tables are called variable length code (VLC) tables in MPEG). A JPEG coder typically uses four Huffman tables for luminance DC coefficient differences, chrominance DC coefficient differences, luminance AC coefficients, and chrominance AC coefficients, respectively. In the randomized Huffman coding schemes, "multiple Huffman tables" refers to employing multiple Huffman tables in place where a single Huffman table is used in the conventional coders, e.g., multiple Huffman tables for luminance DC coefficients, multiple Huffman tables for chrominance DC coefficients, etc. Preferably, each Huffman table is replaced by multiple tables; however, it is possible to use multiple tables or replace only some of Huffman tables in the conventional coder, while continue to use single tables for some other Huffman tables in the conventional coder.

Figure 4:
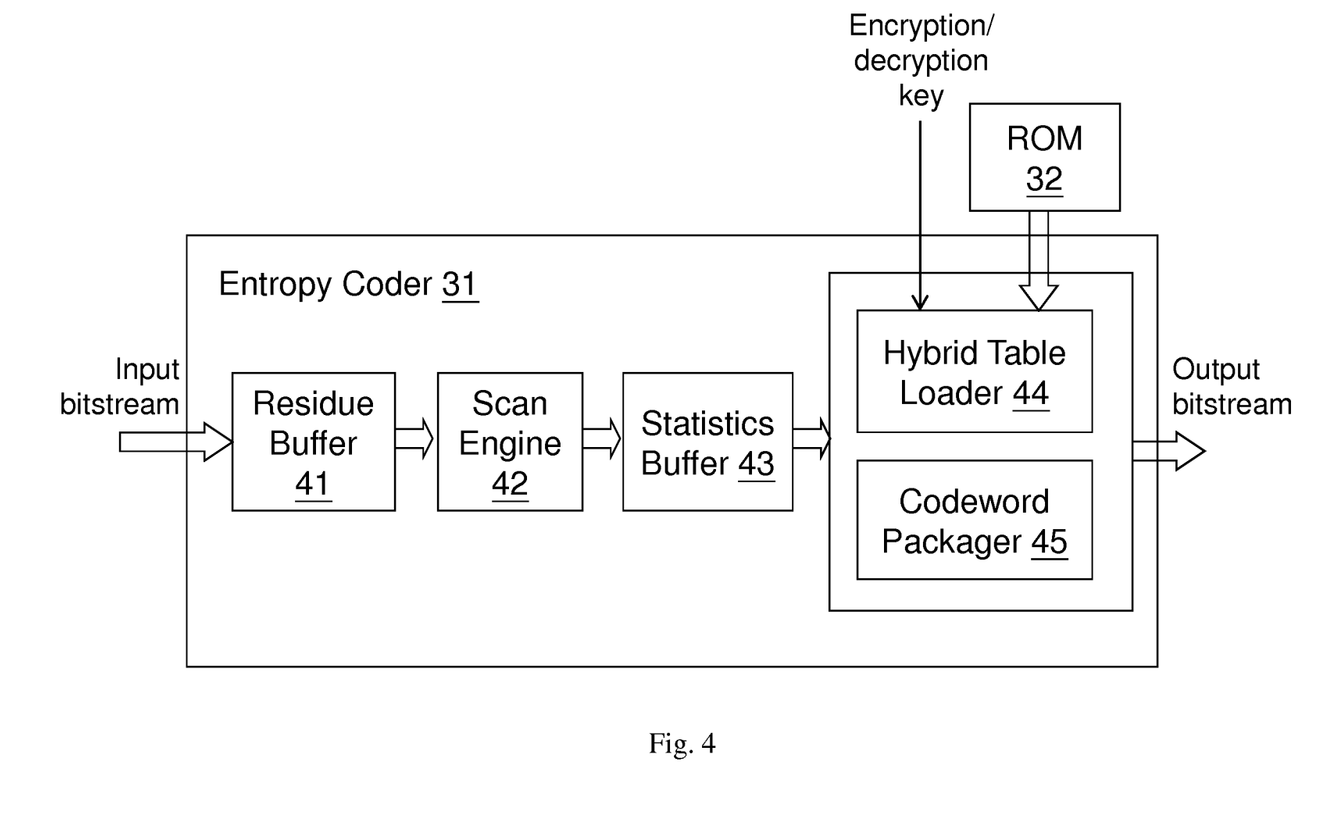
FIG. 4 illustrates the structure of the entropy coder in FIG. 3 and a data flow in an entropy encoding process.

FIG. 4 illustrates the structure of the entropy coder 31 and a data flow in an entropy encoding process. The input bitstream is received from the bus and the output bitstream is outputted to the bus (see FIG. 3). A first buffer 41 is provided to buffer the input data, such as blocks of quantized DCT (discrete cosine transform) coefficients. A scan engine 42 rearranges the blocks of DCT coefficients by scanning each block (e.g. 8 by 8) of DCT coefficients in a scanning order (e.g. zigzag order). A second buffer 43 buffers the data from the scan engine 42, such as the rearranged DCT coefficients, and convert them to symbols such as run/level symbols (for MPEG), run/size symbols (for JPEG), etc. The first buffer 41, the scan engine 42 and the second buffer 43 are employed in conventional entropy coders and their functions are the same as in a conventional entropy coder.

In a conventional entropy coder, the symbols generated by the second buffer 43 are converted to Huffman codewords (also referred to as VLC codewords) using a single set of Huffman tables. For example, all DC coefficient differences are converted to Huffman codewords using a single Huffman table. A conventional entropy coder includes a table loader that performs a table lookup, which uses the symbols to look up the Huffman codewords from Huffman table in the ROM. The Huffman codewords generated by the table lookup are then packaged by a codeword packager to generate the output bitstream.

In the entropy coder 31 according to an embodiment of the present invention, a hybrid table loader 44 converts the symbols from the second buffer 42 to randomized Huffman codewords using the Huffman table in the ROM 42 and the encryption/decryption key, as will be described in more detail later. A codeword packager 45 packages the randomized Huffman codewords from the hybrid table loader 44, in a manner similar to a codeword packager in a conventional entropy coder, to generate the output bitstream.

Figure 5:
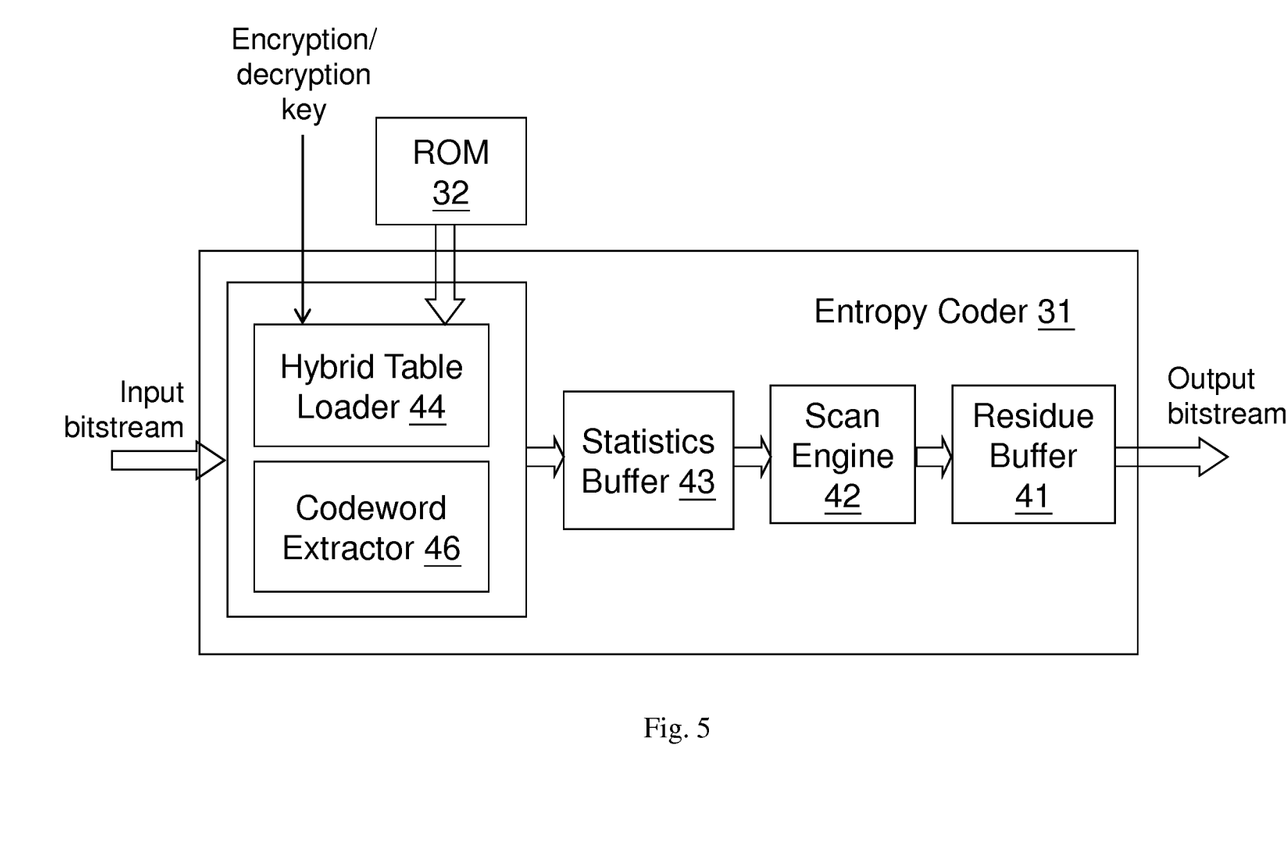
FIG. 5 illustrates the structure of the entropy coder in FIG. 3 and a data flow in an entropy decoding process.

The entropy coder 31 can be configured to perform both entropy encoding and decoding. The various components of the entropy coder can be configured by a controller (not shown) to perform their respective functions during encoding and decoding; the flow of data between the various components of the entropy coder 31 is also controlled by the controller. The data flow in decoding is generally the reverse of the data flow in encoding. FIG. 5 illustrates the entropy coder 31 and a data flow in an entropy decoding process. The input bitstream is received from the bus and the output bitstream is outputted to the bus (see FIG. 3). The input bitstream is processed by a codeword extractor 46, e.g., to remove extra formatting, in a manner similar to a codeword extractor in a conventional entropy decoder, to generate a stream of randomized Huffman codewords. A hybrid table loader 44 performs de-randomization of the randomized Huffman codewords based on the encryption/decryption key to generate the original Huffman codewords, and performs a table lookup to convert the original Huffman codewords back to symbols using the Huffman code tables in the ROM 32, as will be described in more detail later.

The second buffer 43 converts the symbols generated by the hybrid table loader 44, such as run/size and run/level symbols, into data values such as DCT coefficients. The scan engine 42 rearranges the DCT coefficients from the zigzag arrangement back to blocks of DCT coefficients. The first buffer 41 is provided to buffer the rearranged blocks of DCT coefficients.

Figure 6:
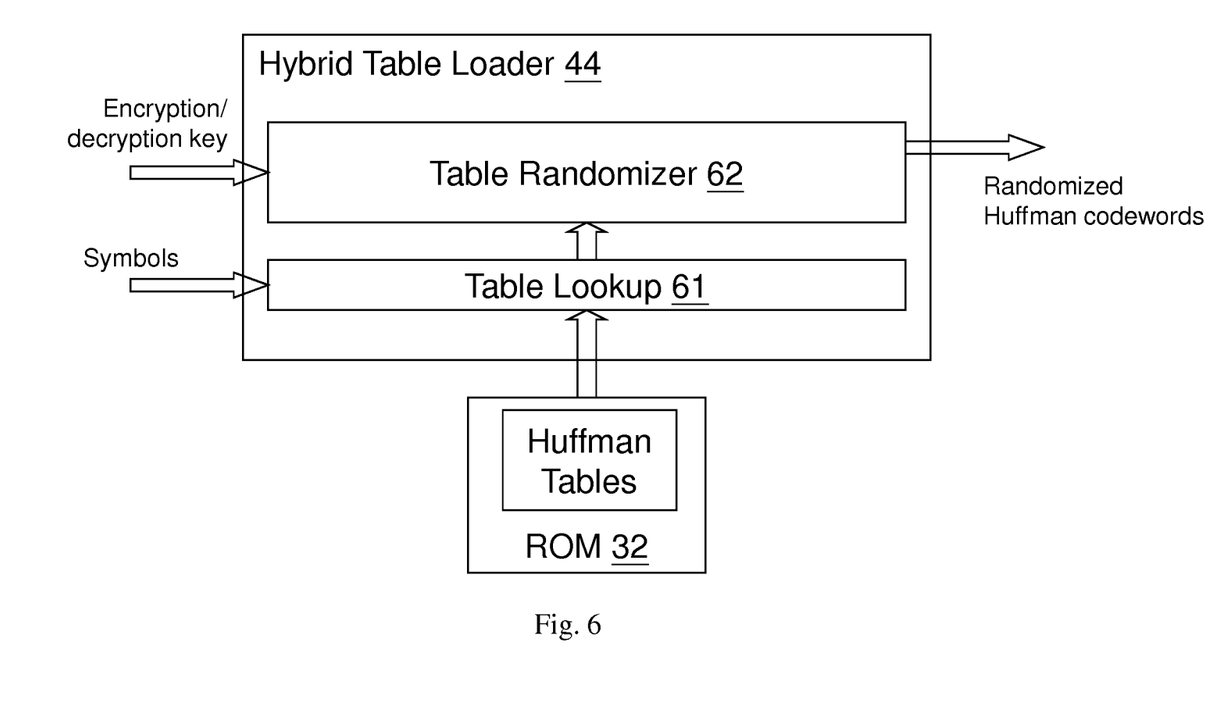
FIGS. 6 and 7 illustrate the structure of the hybrid table loader of the entropy coder in FIG. 4 and a data flow in an entropy encoding process.
Figure 7:
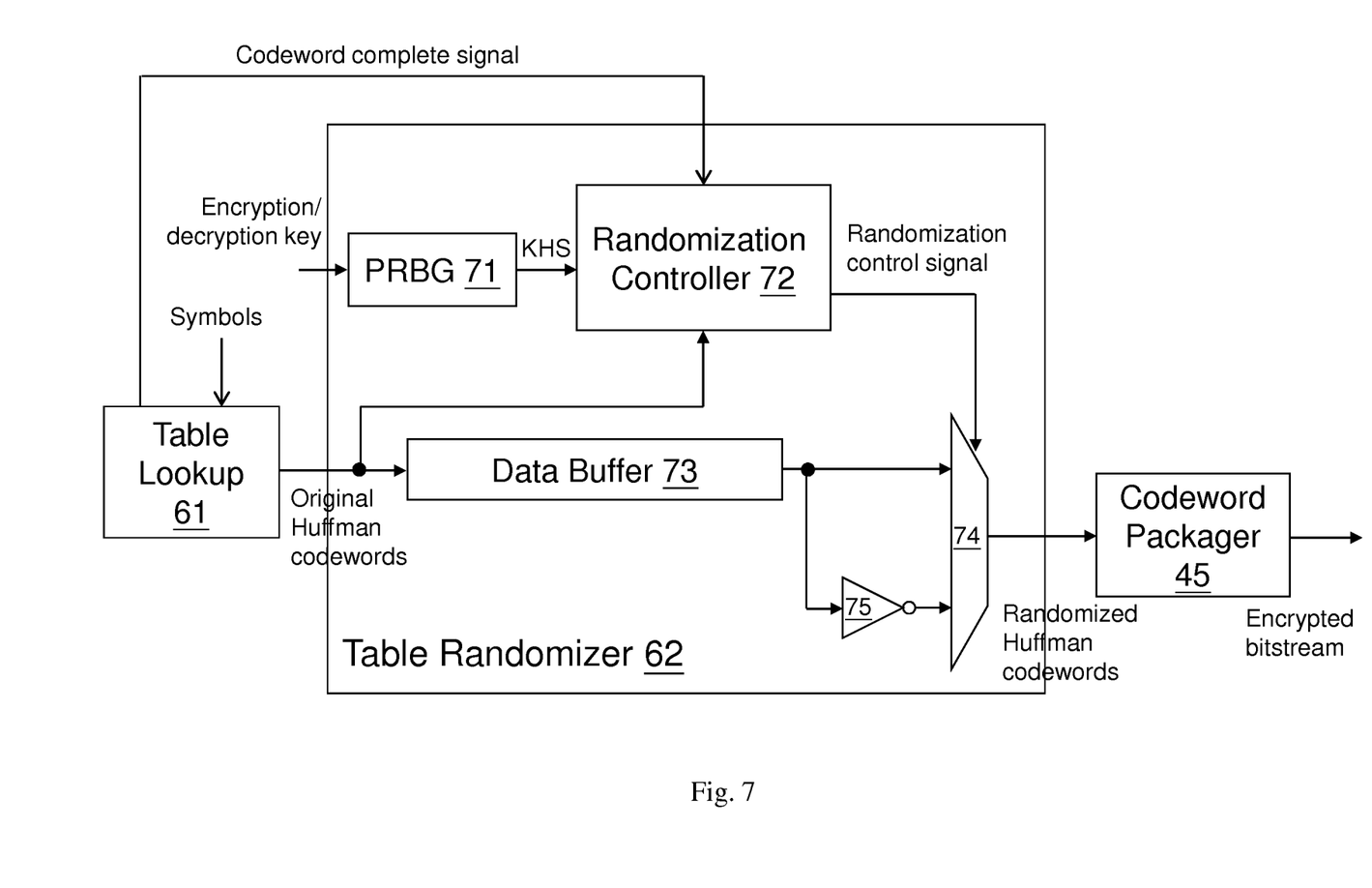

FIG. 6 and FIG. 7 illustrate the structure of the hybrid table loader 44 and a data flow in an entropy encoding process. As shown in FIG. 6, the hybrid table loader 44 includes a table lookup section 61 and a table randomizer section 62. FIG. 7 illustrates more detail of the table randomizer 62 and shows its relationship with the table lookup 61 and the codeword packager 45 (see FIG. 4) in an entropy encoding process. The table lookup 61 receives the symbols as input, and performs table lookup using the single set of Huffman tables in the ROM 32 to convert the input symbols into Huffman codewords. The Huffman codewords generated by the table lookup 61 are referred to as original Huffman codewords because they have not gone through a randomization process. In other words, using the notations in FIG. 1, the Huffman code table stored in the ROM 32 is the "Huffman code #0", and the codewords generated by the table lookup 61 can be viewed as being generated with an all-zero KHS 104.

The table randomizer 62 receives the encryption/decryption key and the original Huffman codewords, and outputs randomized Huffman codewords. As illustrated in FIG. 7, the original Huffman codewords from the table lookup 61 are fed to a randomization controller 72 and a data buffer 73 of the table randomizer 62. A pseudorandom bit generator (PRBG) 71 of the table randomizer 62 receives the encryption/decryption key and generates a KHS based on the key, and provides the KHS to the randomization controller 72.

In addition to the original Huffman codewords, the randomization controller 72 also receives a codeword complete signal from the table lookup 61. Due to the variable length nature of Huffman codewords, the randomization controller 72 is unable to determine independently, from the stream of Huffman codewords, when a Huffman codeword ends and when the next one starts. Thus, the table lookup 61 generates codeword complete signal while performing table lookup to indicate boundaries of the codewords. The randomization controller 72 generates a randomization control signal based on the original Huffman codewords, the codeword complete signal and the KHS. The randomization controller 72 uses an isomorphic code generator algorithm to generate the randomization control signal. The randomization control signal is a bitstream that represents whether each bit of the data buffered in the data buffer 73 (the original Huffman codewords) should be changed (from 0 to 1 or from 1 to 0) or not. As illustrated in FIG. 1A, comparing the bitstream 107 generated with randomization to the bitstream 106 generated without randomization, the Huffman codewords have the same number of bits but some bits are changed. Which bits are changed is determined by the KHS and the isomorphic code generation algorithm. Thus, using the example of FIG. 1A, the randomization control signal would be "1000000011010000010110000", where "1" represents a changed bit and "0" represents an unchanged bit.

The data buffered in the data buffer 73 is fed directly to one input pin of a multiplexer 74, and fed to another input pin of the multiplexer 74 via an inverter 75. The multiplexer 74 functions as a switch or selector. It is controlled by the randomization control signal from the randomization controller 72. On a bit-by-bit basis, the multiplexer 74 selects either the original data bit directly from the data buffer 73 or the inverted data bit from the inverter 75, as controlled by the bits of the randomization control signal. As a result, each original Huffman codeword is converted to one of its isomorphic Huffman codewords, and which isomorphic Huffman codeword is generated is determined by the KHS. The output of the multiplexer 74 is therefore a bitstream made up of randomized Huffman codewords. This bitstream is packaged by the codeword packager 45.

The table randomizer 62 is implemented as a logic circuit, such as an ASIC. In one particular example, the total cost (including registers and randomization logic) for a table randomizer which implements randomization using up to eight Huffman codes is less than 5000 gate count, which is relatively small and easy to implement on a chip. The table randomizer may also be implemented by a processor.

Figure 8:
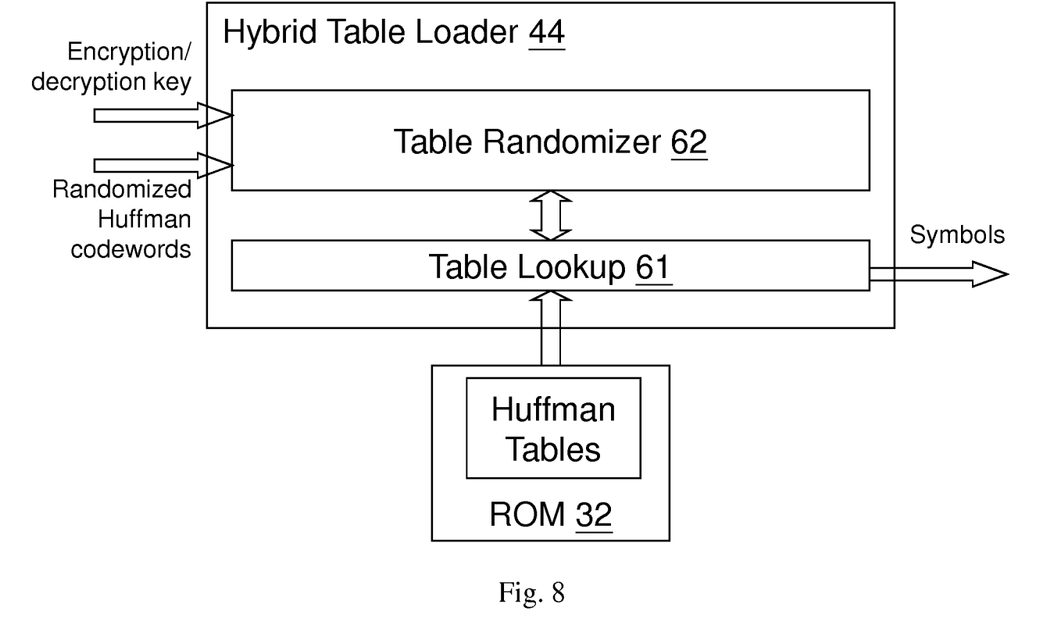
FIGS. 8 and 9 illustrate the structure of the hybrid table loader of the entropy coder in FIG. 5 and a data flow in an entropy decoding process.
Figure 9:
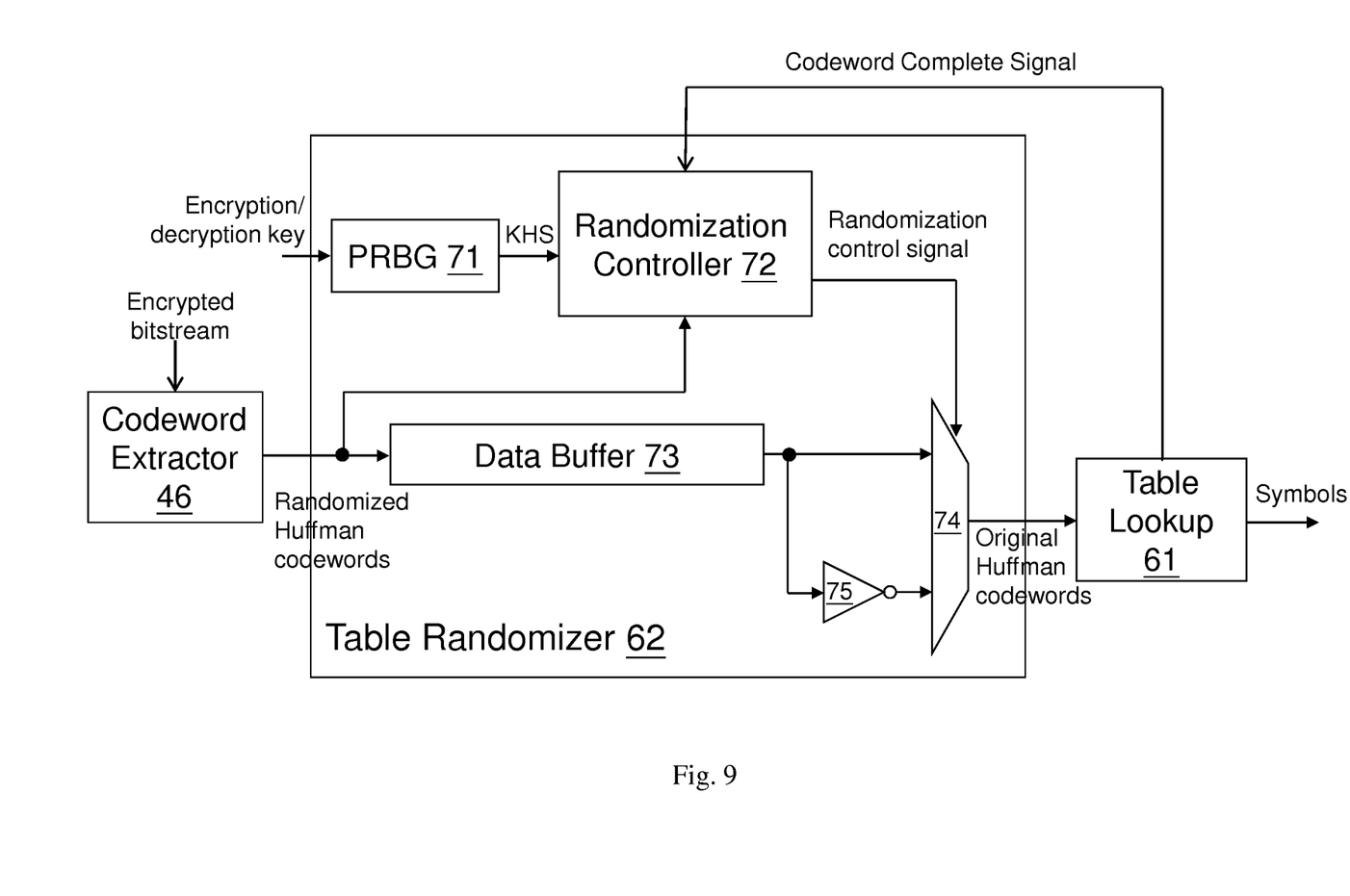

FIG. 8 and FIG. 9 illustrate the hybrid table loader 44 and a data flow in an entropy decoding process. As shown in FIG. 8, the hybrid table loader 44 includes the table lookup section 61 and the table randomizer section 62 (in the decoding process, the table randomizer can be considered a table derandomizer), but the data flow among these components are different from the entropy encoding process of FIG. 6. FIG. 9 illustrates more detail of the table randomizer 62 and shows its relationship with the table lookup 61 and the codeword extractor 46 (see FIG. 4) in an entropy decoding process. The codeword extractor processes the input data (encrypted bitstream) in a manner similar to a codeword extractor in a conventional entropy decoder, for example, removing any container or header in the input bitstream, to generate a stream of randomized Huffman codewords.

The encrypted bitstream representing randomized Huffman codewords is fed to the data buffer 73 as well as the randomization controller 72 of the table-randomizer 62. The randomization controller 72 receives the key hopping sequence KHS, which has been generated by the pseudorandom bit generator (PRBG) 71 using an input encryption/decryption key. The KHS represents which Huffman code table was used to generate each Huffman codeword in the stream of randomized Huffman codewords. Based on the KHS and the randomized Huffman codewords contained in the encrypted bitstream, the randomization controller 72 performs an isomorphic code generator algorithm to generate a randomization control signal for the next bit of the encrypted bitstream. Based on the randomization control signal, the multiplexer 74 outputs the next bit of the encrypted bitstream buffered in the data buffer 73, either directly or after it has been inverted by the inverter 75. As a result, the bit outputted by the multiplexer 74 is a bit of an original Huffman codeword.

The table lookup section 61 looks up the Huffman table (the original Huffman code) in the ROM 32 using this bit of the original Huffman codeword. Due to the variable length nature of Huffman codewords, when a Huffman codeword ends can only be known after performing the table lookup step. Thus, by performing table lookup for the current bit, the table lookup section 61 can determine whether the current Huffman codeword is complete or not (i.e. whether the current bit is the last bit of a Huffman codeword or not). If the Huffman codeword is complete, the table lookup section 61 outputs the symbol corresponding to the Huffman codeword; otherwise, the table lookup section 61 waits for the next bit. Meanwhile, the table lookup section 61 outputs a codeword complete signal to the table randomizer 72 to indicate the boundaries of the codewords. For example, the codeword complete signal can indicate whether the current Huffman codeword is complete or not.

Based on the codeword complete signal, the table randomizer 72 determines whether the next bit in the data buffer 73 should be processed using the current Huffman code (if the current Huffman codeword is not yet complete) or using another Huffman code as indicated by the KHS (if the current Huffman codeword is complete). The table randomizer 72 generates the randomization control signal for the next bit in the encrypted bitstream, and the process repeats.

Referring back to FIG. 3, the entropy coder 31 can be implemented to optionally perform entropy coding without encryption; this may be accomplished by using an all-zero KHS. Thus, the user can have the option to enabled or disabled encryption in entropy coding.

From the above descriptions, it can be seen that embodiments of the present invention modify the entropy coder of a conventional multimedia codec by replacing the table loader with a hybrid table loader, which looks up the Huffman tables from the ROM and randomizes the Huffman codewords based on a KHS. Because isomorphic codes are used as the multiple Huffman codes, the encoded and encrypted data size is substantially the same as encoded data size generated by conventional Huffman coding. The size of the Huffman tables stored in the ROM is substantially the same as in conventional Huffman coding because only one set of Huffman tables is stored and other Huffman tables are dynamically generated by the table randomizer. This approach enables encryption without a large increase in chip area by embedding encryption in the Huffman coder or arithmetic coder. The implementation is cost efficient and offers good encryption performance. The entropy coder substantially maintains the same throughput as conventional Huffman or arithmetic coders. In addition, using the hardware logic circuit implementation of the hybrid table loader speeds up the data loading time as compared to dynamic Huffman codeword generation using a general purpose processor.

Although in the RHT example of FIG. 1 only two Huffman tables are illustrated, a large number of Huffman tables can be used in the RHT algorithm, such as 240 (this number may be referred to as the size of the key space of the encryption algorithm). Storing only one set of Huffman tables in the ROM is efficient especially when the key space is large.

While embodiments above are described using randomized Huffman coding as an example, the table randomizer 62 described here, or a modified version of it, may also be used to implement randomized arithmetic coding or other types of residue coding. While the table randomizer 62 in the Huffman coder shown in FIGS. 6-9 acts as an isomorphic tree generator for randomized Huffman coding, a table randomizer having a similar structure will act as a subinterval indicator generator for a randomized arithmetic coder by carrying out an appropriate algorithm.

Although the embodiments described herein use video and image data as examples, the reconfigurable and scalable encryption/decryption method may be applied to other types of data as well. The entropy codec can be used in a wide range of digital video/image encoders and players, both wired and wireless devices, including media players complying with various standards such as DVD, CH-DVD (China Blue High-Definition), Blu-ray, DTMB, DVB-H (Digital Video Broadcasting—Handheld), DVB-T (Digital Video Broadcasting—Terrestrial) etc.

It will be apparent to those skilled in the art that various modification and variations can be made in the multimedia codec and cryptography-enabled entropy coder of the present invention without departing from the spirit or scope of the invention. Thus, it is intended that the present invention cover modifications and variations that come within the scope of the appended claims and their equivalents.

What is claimed is:

1. An encryption-enabled entropy coder for a multimedia codec, comprising:
   a read-only memory (ROM) storing a single set of code tables, each code table being a code which maps a plurality of symbols to a plurality of codewords;
   a table lookup section coupled to the ROM, the table lookup section receiving an input bitstream containing a plurality of symbols, the table lookup section performing table lookup using the code tables stored in the ROM to convert the symbols to original codewords, the table lookup section further generating a codeword complete signal to indicate boundaries of the original codewords; and
   a table randomizer section coupled to the table lookup section for receiving the original codewords, an encryption/decryption key and the codeword complete signal, the table randomizer section converting the original codewords to randomized codewords based on the encryption/decryption key and the codeword complete signal using an isomorphic code generator algorithm, wherein each randomized codeword is an isomorphic codeword of the corresponding original codeword, the isomorphic codeword corresponding to a location in an isomorphic code tree which is identical to a location of the original codeword in an original code tree, the isomorphic code tree and the original code tree having identical topographies, the isomorphic codeword having identical length as the original codeword but having a different value from the original codeword.

2. The encryption-enabled entropy coder of claim 1, wherein the table randomizer comprises:
   a data buffer receiving and buffering the original codewords;
   a pseudorandom bit generator (PRBG) receiving the encryption/decryption key and generating a key hopping sequence (KHS) comprising a sequence of numbers, each number in the KHS indicating either the code stored in the ROM or one of a plurality of codes that are isomorphic to the code stored in the ROM;
   a randomization controller receiving the KHS, the codeword complete signal, and the original codewords, the randomization controller generating a randomization control signal using the isomorphic code generator algorithm based on the KHS, the codeword complete signal, and the original codewords, the randomization control signal being a bitstream; and
   a switch controlled by the randomization control signal for selectively outputting a next data bit from the data buffer either directly or after being inverted.

3. The encryption-enabled entropy coder of claim 1, wherein the table randomizer section is implemented by logic circuits.

4. The encryption-enabled entropy coder of claim 1, wherein the table randomizer section is implemented by a processor.

5. The encryption-enabled entropy coder of claim 1, further comprising a codeword packager for packaging the randomized codewords generated by the table randomizer into entropy-coded data.

6. The encryption-enabled entropy coder of claim 1, further comprising:
   a first buffer for buffering blocks of quantized spatial transform coefficients;
   a scan engine coupled to the first buffer for scanning each block of quantized spatial transform coefficients in a scanning order; and
   a second buffer for buffering the data from the scan engine and converting them to the symbols, wherein the symbols are inputted to the table lookup section.

7. The encryption-enabled entropy coder of claim 1, wherein the set of code tables stored in the ROM include Huffman code tables.

8. A multimedia codec comprising the encryption-enabled entropy coder of claim 1, further comprising an intra coder, a motion estimation core, a de-blocking core, a memory controller, a memory, and a processor connected together via a bus.

9. An encryption-enabled entropy coder for a multimedia codec, comprising:
  a read-only memory (ROM) storing a single set of code tables, each code table being a code which maps a plurality of symbols to a plurality of codewords;
  a table lookup section coupled to the ROM, the table lookup performing table lookup using the code tables stored in the ROM to convert original codewords to symbols, the table lookup section further generating a codeword complete signal to indicate boundaries of the original codewords; and
  a table randomizer section coupled to the table lookup section, the table randomizer section receiving an encryption/decryption key and the codeword complete signal, the table randomizer section converting input randomized codewords to the original codewords based on the encryption/decryption key and the codeword complete signal using an isomorphic code generator algorithm, wherein each randomized codeword is an isomorphic codeword of the corresponding original codeword, the isomorphic codeword corresponding to a location in an isomorphic code tree which is identical to a location of the original codeword in an original code tree, the isomorphic code tree and the original code tree having identical topographies, the isomorphic codeword having identical length as the original codeword but having a different value from the original codeword, and wherein the original codeword are inputted to the table lookup section.

10. The encryption-enabled entropy coder of claim 9, wherein the table randomizer comprises:
  a data buffer receiving and buffering input randomized codewords;
  a pseudorandom bit generator (PRBG) receiving the encryption/decryption key and generating a key hopping sequence (KHS) comprising a sequence of numbers, each number in the KHS indicating either the code stored in the ROM or one of a plurality of codes that are isomorphic to the code stored in the ROM;
  a randomization controller receiving the KHS, the codeword complete signal, and the randomized codewords, the randomization controller generating a randomization control signal using the isomorphic code generator algorithm based on the KHS, the codeword complete signal, and the randomized codewords, the randomization control signal being a bitstream; and
  a switch controlled by the randomization control signal for selectively outputting a next data bit from the data buffer either directly or after being inverted.

11. The encryption-enabled entropy coder of claim 9, wherein the table randomizer section is implemented by logic circuits.

12. The encryption-enabled entropy coder of claim 9, wherein the table randomizer section is implemented by a processor.

13. The encryption-enabled entropy coder of claim 9, further comprising a codeword extractor for extracting the randomized codewords from input entropy-coded input data and inputting the randomized codewords into the table randomizer section.

14. The encryption-enabled entropy coder of claim 9, further comprising:
  a second buffer for buffering the data from the table lookup section and converting the data into spatial transform coefficients;
  a scan engine coupled to the second buffer for rearranging the spatial transform coefficients into blocks; and
  a first buffer for buffering the rearranged blocks of spatial transform coefficients generates by the scan engine.

15. The encryption-enabled entropy coder of claim 9, wherein the set of code tables stored in the ROM include Huffman code tables.

16. A multimedia codec comprising the encryption-enabled entropy coder of claim 9, further comprising an intra coder, a motion estimation core, a de-blocking core, a memory controller, a memory, and a processor connected together via a bus.

17. A method implemented in an encryption-enabled entropy codec, comprising, for entropy encoding:
  storing a single set of code tables in a read-only memory (ROM), each code table being a code which maps a plurality of symbols to a plurality of codewords;
  performing table lookup using the code tables stored in the ROM to convert a plurality of symbols to original codewords; and converting the original codewords to randomized codewords based on an encryption/decryption key using an isomorphic code generator algorithm, wherein each randomized codeword is an isomorphic codeword of the corresponding original codeword, the isomorphic codeword corresponding to a location in an isomorphic code tree which is identical to a location of the original codeword in an original code tree, the isomorphic code tree and the original code tree having identical topographies, the isomorphic codeword having identical length as the original codeword but having a different value from the original codeword.

18. The method of claim 17, further comprising, for entropy decoding:
  converting a plurality of randomized codewords to original codewords based on the encryption/decryption key using an isomorphic code generator algorithm, wherein each randomized codeword is an isomorphic codeword of the corresponding original codeword; and
  performing table lookup using the code tables stored in the ROM to convert the original codewords to symbols.

* * * * *